United States Patent [19]

Buikema et al.

[11] 4,146,515

[45] Mar. 27, 1979

[54] MAKING A LIGHTLY OXIDIZED STARCH ADDITIVE BY ADDING A CATIONIC POLYMER TO STARCH SLURRY PRIOR TO HEATING THE SLURRY

[75] Inventors: Peter D. Buikema, Wisconsin Rapids, Wis.; Thomas Aitken, Chicago, Ill.

[73] Assignee: Nalco Chemical Company, Oak Brook, Ill.

[21] Appl. No.: 832,324

[22] Filed: Sep. 12, 1977

[51] Int. Cl.$^2$ .............................................. C08L 3/10
[52] U.S. Cl. ................................ 260/9; 162/164 EP; 162/168 N; 162/168 NA
[58] Field of Search ............................................ 260/9

[56] References Cited

U.S. PATENT DOCUMENTS

| | | | |
|---|---|---|---|
| 2,876,217 | 3/1959 | Paschall | 536/50 |
| 3,017,294 | 1/1962 | Meisel | 260/9 |
| 3,598,623 | 8/1971 | Powers et al. | 106/214 |
| 3,637,656 | 1/1972 | Germino et al. | 536/50 |
| 3,666,751 | 5/1972 | Jarowenko et al. | 536/50 |
| 3,674,725 | 7/1972 | Aitken et al. | 260/9 |
| 3,770,472 | 11/1973 | Jarowenko | 106/213 |
| 3,854,970 | 12/1974 | Aitken | 106/210 |
| 3,912,715 | 10/1975 | Jarowenko | 162/175 |
| 4,029,885 | 6/1977 | Buikema | 536/50 |
| 4,066,495 | 1/1978 | Voight | 162/168 NA |

FOREIGN PATENT DOCUMENTS

404812  8/1969  Australia ................................. 536/50

*Primary Examiner*—Edward M. Woodberry
*Attorney, Agent, or Firm*—John G. Premo; Robert A. Miller; John S. Roberts

[57] ABSTRACT

Paper and other cellulose materials are sized with a cationic starch prepared by forming an aqueous slurry of a lightly oxidized starch, adding a cationizing agent to the slurry and then heating the slurry in a continuous cooker.

2 Claims, No Drawings

MAKING A LIGHTLY OXIDIZED STARCH ADDITIVE BY ADDING A CATIONIC POLYMER TO STARCH SLURRY PRIOR TO HEATING THE SLURRY

BACKGROUND OF THE INVENTION

Field of the Invention

Various types of modified starches have been used in treating paper in order to improve its strength and surface characteristics. For example, modified starch additives are commonly coated onto formed cellulosic sheets in size presses and other types of coating apparatus.

In these times of increasing awareness of the environmental aspects of manufacturing processes, it has been noted that cationic starches reduce BOD pollution problems. Cationic starches help retain fiber fines. They exhibit superior absorbancy onto anionic cellulosic fibers and onto common pigments. This improved absorbance and attendant superior pigment binding efficiency means that lesser amounts of cationic starch can be used to meet sheet specifications. Since lesser amounts of starch are used and a greater percentage of the starch used is bound onto the cellulose fiber, lesser amounts of BOD-producing starch will be present in effluents produced during paper manufacture.

These important BOD-related properties of cationic starches are believed to be due to attraction between the starch and both anionically charged pigment and fiber resulting in improved chemical anchoring of coatings to the cellulose. When cationic starch is used as a surface size, more starch is retained on or near the surface of the sheet than is retained with conventional starches. Thus, less starch is needed to maintain surface strength and quality. Since the cationic starch is tightly bound to the paper fiber, it is not removed during the repulping of broke. Hence, starch from the broke is recovered in the papermaking operation rather than being lost in the mill effluent. This attachment to the fiber coupled with the fact that reduced amounts of cationic starch are needed at the size press results in significant reductions in mill effluent BOD.

In addition, cationic surface sizing results in improved printing properties. These improved properties are believed to be due to a combination of fiber bonding and surface orientation resulting in more uniform starch concentration on the paper surface, and hence more uniform ink receptivity and improved ink hold-out. The improved fiber bonding provides a strong paper surface. Among the various improved printing characteristics experienced with the use of cationic starches are: better printing uniformity, better print definition, greater depth of color, reduced ink show-through, fewer pick-outs on offset press and reduced dusting.

Cationic starches are generally manufactured in an approximately 12 hour process by reacting the granular starch in an alkaline medium with appropriate tertiary or quaternary amines, followed by neutralizing, washing and drying. The alkaline agent serves to promote reaction of the amine with the starch. Thus, in production of such commercial dry cationic starches, a special manufacturing process is required, increasong cost and offerring potential stream pollution hazards.

U.S. Pat. No. 4,029,885 describes a means for avoiding problems associated with the use of the alkaline agent which entails the treatment of gelatinous anionic starches with a cationizing agent. The anionic starches employed in U.S. Pat. No. 4,029,885 include commercially available oxidized starches and ammonium persulfate process pearl starches.

A method for producing cationic starches which has the important advantages of the U.S. Pat. No. 4,029,885 starches and also exhibit significantly enhanced retention on the paper fiber has now been discovered. As elaborated further below, this method requires the use of a limited group of anionic starches and the use of a very specific cationizing procedure.

SUMMARY OF THE INVENTION

The invention comprises an improved process for making cationic starch useful in surface sizing and coating of cellulosic materials. The invention contemplates that an aqueous slurry of a lightly oxidized starch will be formed, from 1-25% and preferably from 3-15% by weight of a cationizing agent will be added to the slurry and then the slurry will be heated in a continuous cooker to form an improved gelatinous cationic starch.

The invention is directed primarily to "in-mill" continuous cooker applications. Certain anionic starches described below must be utilized in the practice of the invention. It is key to the practice of the invention that the cationizing agent be added prior to heating the starch slurry in the continuous cooker.

It should be noted at this point that the U.S. Pat. No. 4,029,885 referred to earlier states at column 4, lines 59-63, that the cationizing agent may be added at any time during the gelatinization and preferably that it should be added very late in the cook or after gelatinization is complete. The present invention thus differs significantly from the teaching of the U.S. Pat. No. 4,029,885 since Applicants' method requires that the cationizing agent be added substantially before the gelatinization process commences.

The Anionic Starches

The anionic starches used in the practice of the present invention are of a commercially available "partially oxidized" nature. These starches are sometimes referred to as "touch-modified."

One common method of manufacture of oxidized starches entails the addition of a predetermined quantity of sodium hypochlorite to an aqueous starch slurry. Alkali is added to maintain the pH at 8-10 throughout the reaction and cooling is used to maintain the temperature in the range 21°-38° C. The amount of hypochlorite added is usually equivalent to between 0.5 and 6.0% available chlorine, based on starch. Since the viscosity of the starch is inversely related to the degree of oxidation, the amount of hypochlorite is chosen based on the desired viscosity of the starch to be made. Following a reaction period of 5-24 hours, the slurry is neutralized and free chlorine is destroyed with sodium bisulfite. Soluble by-products are then removed by washing and the starch is collected on vacuum filters and dried.

Since, as noted earlier, the degree of oxidation of starch is inversely related to viscosity, the "partially oxidized" starches useful in the practice of the invention can be delineated in terms of the viscosity of an aqueous starch slurry. The partially oxidized starches useful in the practice of the invention thus should have a viscosity of from 100-500 centipoises and preferably from 200-300 centipoises at a 6% concentration by weight and 150° F. A typical commercially available touch-modified starch useful in the practice of the invention is D-210, a product of Grain Processing Corporation. The viscosity of this starch at 6% by weight and 150° F. is 250 centipoises.

The Cationizing Agents

The preferred cationizing agent is epichlorohydrin-dimethylamine condensate. However, other cationizing agents which would be useful in the practice of this invention would include diallyl dimethyl ammonium chloride polymer, quaternized ethylene dichloride-ammonia reaction product, quaternized polyethyleneimine and quaternized polyepichlorohydrin.

THE EPICHLOROHYDRIN-DIMETHYLAMINE CONDENSATE

The epichlorohydrin-dimethylamine (EPI-DMA) condensate which is used to react with the starch may be prepared by admixing EPI with DMA in approximately equimolar proportions utilizing reaction condensate conditions of temperatures about 60°–80° C. for one hour under alkaline pH conditions, as for example using 5% NaCl or a preferred range of 5–8% alkali metal hydroxide. The product is subsequently acidified with a mineral acid such as HCl to a pH of about 3.0, thus producing an amine salt or a quaternary ammonium anion site on the nitrogen of the DMA moiety. The basic condensate is a one-to-one reaction of EPI wherein the epoxy ring is attached or opened by DMA or ammonia to form the basic condensate which may further condense in irregular linear fashion.

With reference to the term epichlorohydrin, it is understood for purposes of this invention that the brom analog, epibromhydrin, may be utilized in place of the preferred EPI. The variation of reaction conditions to produce the ternary compositions of the present invention e.g., EPI-DMA-ammonia, may be achieved by adding to the mix up to 30% molar of ammonium hydroxide utilized as concentrated ammonium hydroxide (26° Be). The ternary compositions embodying 10% ammonia and 20% ammonia are preferred in this invention, and the efficacy of these compositions is believed due to the high proportion of quaternary ammonium groups which is effective for starch cationization at higher pH levels than a composition derived entirely from ammonia and EPI. The present condensates thus show particular advantages over starches modified with tertiary amines or tertiary amine polymers.

The proportions of EPI and DMA which are used at a preferred equimolar ratio may vary within the range of about 0.8–3 mols of EPI to 1 mol of DMA. Condensates utilizing greater than 3 tend to crosslink the starch. On the other hand, condensates using less than 0.8 mols of EPI per mol of DMA lack sufficient reactive sites. Where utilized herein broadly the term "condensate" refers to both the binary EPI-DMA and the ternary EPI-DMA-NH$_3$ condensates described and claimed herein. A typical procedure for preparing the EPI-DMA-NH$_3$ condensate is described in Example 1 of the U.S. Pat. No. 4,029,885.

Use in Paper Sizing

As discussed earlier, the cationic starch described above is both useful and practical in the surface treatment of cellulosic materials. This modified starch constitutes an important surface sizing material. Usually, the amounts employed will be at least 30 pounds of the cationic starch per ton of cellulosic material, which corresponds to 1.5% by weight. Ordinarily, the dosage will be within the range of 1.5–12.5% by weight, and preferably it will be within the range of 3.0–7.5%.

The cationic starch may be applied by any of the common surface treatment processes well known in the art, including processes utilizing a vertical or horizontal size press, tub sizing apparatus or calender sizing, etc. Among the improved paper properties attainable by using the cationic starch are increases in the surface strength and opacity, as well as increases in the density or reduction in the porosity of the cellulose fibers, increases in water repellancy and improved resistance to ink penetration. The invention is especially useful for the preparation of printing papers. It can also be used in making board grade paper used in making liners of single faced or double faced corrugated board, or in the corrugating medium itself.

PREFERRED EMBODIMENT

Although dosages will vary depending on the actual and desired characteristics of the cellulosic materials being treated, in a preferred embodiment, the dosage of cationic starch would be about 100 pounds per ton. This contemplates the use of D-210 which has been treated with 5% by weight of the EPI-DMA condensate described in the U.S. Pat. No. 4,029,885.

EXAMPLE 1

The purpose of the experiments described below was to compare the amounts of soluble starch released upon repulping of paper stock coated with starch prepared according to the method of this invention to the amounts released of starches prepared by other commonly utilized methods.

Sheets of a commercial 45 pound offset grade base paper made from hard wood and soft wood kraft pulp containing ¼% rosin and ½% alum were sized on a coating machine (Keegan coater) and dried on a drum drier (Noble and Wood). The paper was then repulped and filtered and the filtrate was tested in order to determine starch retention on the paper.

The measurement of relative starch retention entailed a colorimetric determination based upon the use of starch sensitive dyes. The starch content measured was that present in the filtrate of the repulped coated paper. The comparison entailed the use of: (1) paper coated with uncationized starch, (2) paper coated with "fully oxidized" starch (15 centipoises at 6% and 150° F.) cationized by addition of cationizing agent both before and after the cooker, and (3) "touch-modified" starch (250 centipoises at 6% and 150° F.) cationized both before and after the cooker. The data obtained is set forth in Table I below.

Examination of the data in Table I will show that while little difference was observed between fully oxidized starch cationized either before or after the cooker, touch-modified starch cationized by the addition of cationizing agent *before* the cooker showed significant improvements in starch retention.

TABLE I

| | Sample Description | Soluble Starch ppm | % Reduction |
|---|---|---|---|
| 1. | Base stock | 0 | — |
| 2. | Fully oxidized* starch cooked at 280° F. | 55 | — |
| 3. | Fully oxidized starch cooked as above, but Epi-DMA-NH$_3$ polymer solution containing 4.7% active polymer on starch solids added after cook | 18 | 67.3 |
| 4. | As in 3, but polymer solution added to |  |  |

TABLE I-continued

| | Sample Description | Soluble Starch ppm | % Reduction |
|---|---|---|---|
| | starch slurry before cook | 19.5 | 64.5 |
| 5. | Partially oxidized** D-210 starch cooked at 280° F. | 61 | — |
| 6. | Partially oxidized D-210 starch cooked as above, but Epi-DMA-NH$_3$ polymer solution containing 4.7% active polymer on starch solids added after cook | 43 | 29.5 |
| 7. | As in 6, but polymer solution added to starch slurry before cook | 18 | 70.5 |

*15 centipoise at 6% starch solids and 150° F.
**250 centipoise at 6% starch solids and 150° F.

We claim:

1. An improved process for making gelatinous cationic starch useful in surface sizing and coating of cellulosic materials of the type which comprises forming an aqueous slurry of lightly oxidized starch have a viscosity of from 100–500 centipoises and preferably from 200–300 centiposies at a 6% concentration by weight and 150° F., heating the aqueous starch slurry in a continuous cooker to gelatinize the starch and treating the gelatinized starch with from 1–15% by weight of a cationizing polymer selected from one member of a group consisting of epichlorohydrin-dimethylamine condensate, diallyl dimethyl ammonium chloride polymer, quaternized ethylene dichlorideammonia reaction product, quaternized polythyleneimine and quaternized polyepichlorohydrin based on the weight of the starch wherein the improvement comprises adding the cationic polymer to the aqueous starch slurry prior to heating the slurry in the continuous cooker.

2. The improved process of claim 1 wherein the cationizing agent is a condensate of generally equimolar quantities of epichlorohydrin and dimethylamine.

* * * * *